United States Patent
Chen et al.

(10) Patent No.: US 7,140,017 B2
(45) Date of Patent: Nov. 21, 2006

(54) PERFORMANCE OF CHANNELS USED IN COMMUNICATING BETWEEN SENDERS AND RECEIVERS

(75) Inventors: Shawfu Chen, New Milford, CT (US); Robert O Dryfoos, Hopewell Junction, NY (US); Allan Feldman, Poughkeepsie, NY (US); David Y Hu, Poughkeepsie, NY (US); Jason A Keenaghan, Wappingers Falls, NY (US); Peter A Lewis, Jacksonville, FL (US); Peter G Sutton, Lagrangeville, NY (US); Alice M Williams-Obleton, Poughkeepsie, NY (US); Mei-Hui Wang, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/790,781

(22) Filed: Feb. 22, 2001

(65) Prior Publication Data

US 2002/0116435 A1    Aug. 22, 2002

(51) Int. Cl.
*G06F 9/46* (2006.01)
*G06F 15/16* (2006.01)

(52) U.S. Cl. .................... 718/101; 709/206
(58) Field of Classification Search ........ 718/100–108, 718/1; 709/200–253; 719/310
See application file for complete search history.

(56) References Cited

U.S. PATENT DOCUMENTS

| | | | | |
|---|---|---|---|---|
| 4,523,310 A * | 6/1985 | Brown et al. | ................ | 370/540 |
| 5,166,930 A | 11/1992 | Braff et al. | ................ | 370/94.1 |
| 5,404,553 A * | 4/1995 | Komori et al. | ................ | 712/25 |
| 5,524,268 A * | 6/1996 | Geldman et al. | ............... | 710/5 |
| 5,818,344 A | 10/1998 | Sharpe | .................. | 340/824.21 |
| 5,878,056 A | 3/1999 | Black et al. | ................... | 371/32 |
| 5,960,178 A * | 9/1999 | Cochinwala et al. | ........ | 709/232 |
| 6,178,459 B1 * | 1/2001 | Sugiyama | ................... | 709/238 |
| 6,625,117 B1 * | 9/2003 | Chen et al. | .................. | 370/227 |
| 6,718,454 B1 * | 4/2004 | Ebner et al. | ................. | 711/213 |
| 6,813,249 B1 * | 11/2004 | Lauffenburger et al. | .... | 370/253 |
| 2002/0120697 A1 * | 8/2002 | Generous et al. | ........... | 709/206 |

FOREIGN PATENT DOCUMENTS

SU    1075429    2/1984

OTHER PUBLICATIONS

"A Universal Data Transport Method", International Business Machines Corporation Research Disclosure 425101, Sep. 1999, pp. 1255-1256.
"Linking SAP System To MQ Series Server—Using Transaction MQ Queue Holding Messages Indicating Processing Of Transaction By Server", International Business Machines Corporation Research Disclosure 415085 A, Nov. 10, 1998.

\* cited by examiner

*Primary Examiner*—Meng-Al T. An
*Assistant Examiner*—Kenneth Tang
(74) *Attorney, Agent, or Firm*—Eugene I. Shkurko, Esq.; Heslin Rothenberg Farley & Mesiti P.C.

(57) ABSTRACT

A plurality of batch lists are maintained by a channel in order to improve the efficiency of the channel in performing messaging between a sender and a receiver. For example, a Next Batch list is used to prefetch messages to be sent to the receiver from the sender; a Current Batch list includes the messages currently being transmitted to the receiver or waiting confirmation; and an Acknowledged Batch List includes the messages confirmed by the receiver. This allows the functions of prefetching messages, sending messages and deleting confirmed messages to be performed in parallel.

3 Claims, 11 Drawing Sheets

PERFORMANCE OF CHANNELS USED IN COMMUNICATING BETWEEN SENDERS AND RECEIVERS

TECHNICAL FIELD

This invention relates, in general, to network messaging, and in particular, to improving the performance of channels used in the messaging.

BACKGROUND ART

One technology that supports messaging and queuing across a network is referred to as MQSeries and is offered by International Business Machines Corporation. With MQSeries, users can dramatically reduce application development time by using MQSeries API functions. Since MQSeries supports many platforms, MQSeries applications can be ported easily from one platform to another. In a network, two MQSeries systems communicate with each other via channels, such as MQSeries channels. An MQSeries sender channel defines a connection from one MQSeries system to another MQSeries system and transmits messages from the one system to the other system.

An MQSeries sender channel performs various functions, including establishing a channel connection with another MQSeries system; obtaining a batch of messages from its associated transmission queue; and sending the batch of messages to the other end of the channel. At the end of the batch, it requests the MQSeries system on the other end to confirm whether it has received and hardened the batch. When the confirmation is received, the MQSeries sender channel deletes the batch of messages from the transmission queue. Then, the process of obtaining, sending and deleting a batch of messages is repeated.

Unfortunately, however, the MQSeries sender channel is idle at various steps of its processing. For example, it is idle when a batch of messages is being obtained from its associated transmission queue, and it is idle when a batch of messages is being deleted from the transmission queue. Thus, the MQSeries sender channel does not perform as efficiently, as desired.

Based on the foregoing, a need exists for improvements to sender channels to make them perform more efficiently. In particular, a need exists for a technique that makes use of the idle times of a channel.

SUMMARY OF THE INVENTION

The shortcomings of the prior art are overcome and additional advantages are provided through the provision of a method of performing messaging using a channel coupled to a sender and a receiver. The method includes, for instance, transmitting from the sender to the receiver via the channel a batch of one or more messages; and prefetching by a separate process, during the transmitting, another batch of one or more messages to be transmitted.

In one example, the method further includes deleting, during the transmitting, a previously sent batch of one or more messages from a transmission queue.

In a further aspect of the present invention, a method of performing messaging using a channel coupled to a sender and a receiver is provided. The method includes, for instance, assigning, by a separate process, one or more messages of a transmission queue to a queue batch list; deleting one or more messages of an acknowledged batch list from the transmission queue, if the one or more messages of the acknowledged batch list exist; and transmitting a current batch list of one or more messages from the sender to the receiver, wherein the assigning, deleting and transmitting are performed substantially in parallel.

In accordance with an aspect of the present invention, the performance of a sender channel is improved by the use of a plurality of batch lists. The sender channel is able to prefetch, by a separate process, messages from the transmission queue to be ultimately sent to the remote location. This prefetching enables messages to be sent as soon as they can be sent and reduces the idle time of the sender channel.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, the performance of a channel, such as a sender channel, is improved, such that messages are transmitted from one end of the channel to the other end of the channel faster. In one example, messages to be transmitted are prefetched, and thus, ready to be sent on command. Further, various of the messaging steps are performed in parallel, as described below, thus reducing idle time of the channel.

Figure 1:
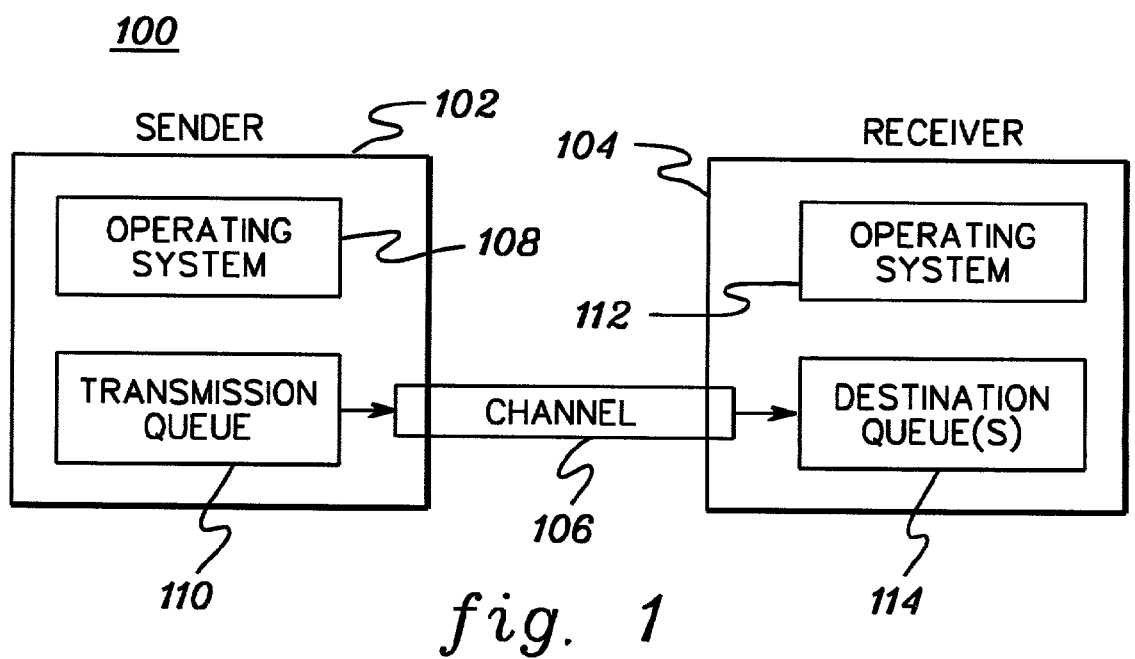
FIG. 1 depicts one embodiment of a communications environment incorporating and using one or more aspects of the present invention.

One embodiment of a communications environment incorporating a channel that takes advantage of one or more aspects of the present invention is depicted in FIG. 1. As shown in FIG. 1, a communications environment 100 includes, for instance, a sender 102 coupled to a receiver 104 via one or more channels 106. In one example, sender 102 is a computing unit having an operating system 108, such as the TPF Operating System offered by International Business Machines Corporation, and one or more transmission queues 110. The transmission queues include messages to be transmitted to receiver 104.

Receiver 104 is also a computing unit, as one example. It includes an operating system 112, such as the TPF Operating System, and one or more destination queues 114 for receiving messages transmitted from sender 102.

In one embodiment, channel 106 is a sender channel, and is based, for instance, on MQSeries, offered by International Business Machines Corporation. MQSeries is described in a publication entitled, *MQSeries Intercommunication*, IBM Publication No. SC33-1872-03 (March 2000), which is hereby incorporated herein by reference in its entirety.

Figure 2A:
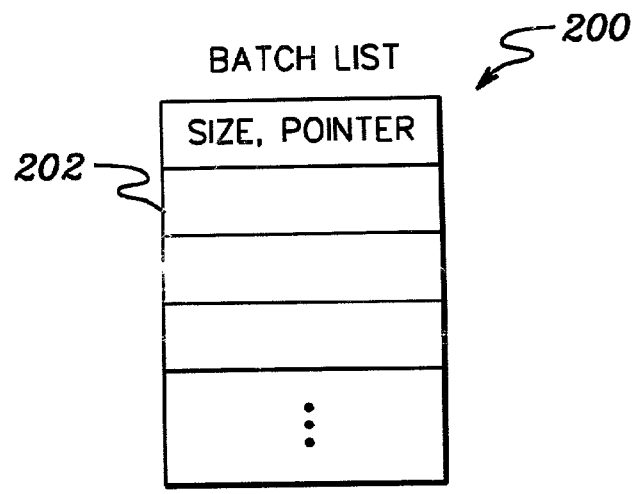
FIGS. 2a–2b depict various batch lists used in transmitting messages, in accordance with an aspect of the present invention.

As one example, messages are transmitted in batches. A batch list 200 (FIG. 2a) is carved out from memory at the start of a sender channel time and is used to temporarily hold one or more messages. Each entry 202 in the batch list includes the size of the message and a message pointer indicating the location of the message.

Figure 2B:
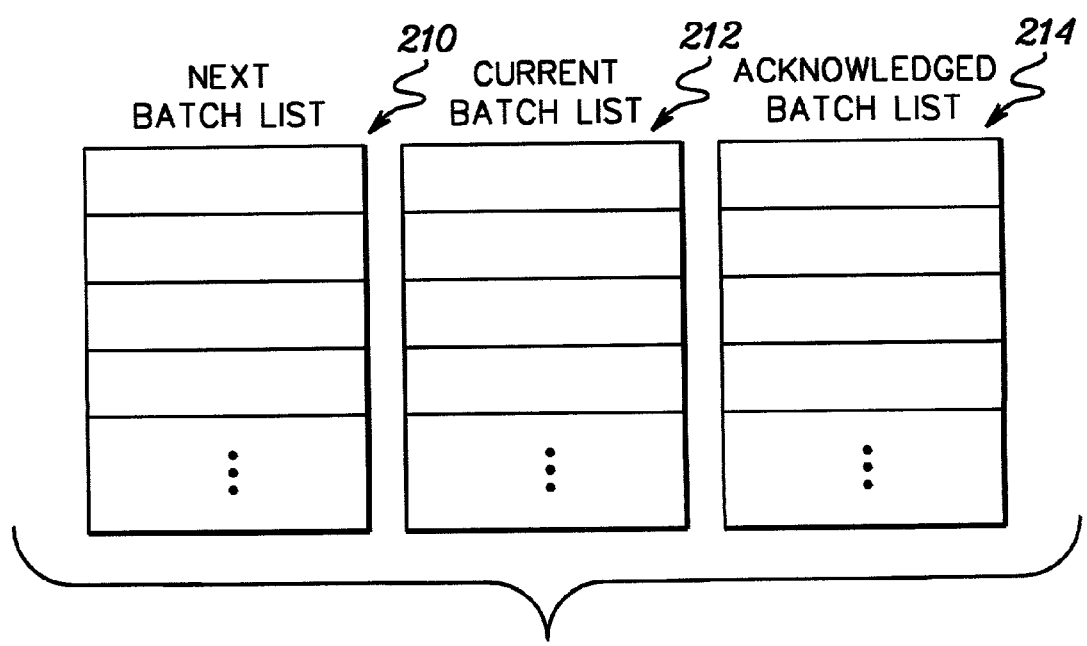

In accordance with an aspect of the invention, a plurality of batch lists are used to improve the performance of the channel. As one example, the plurality of batch lists include a Next Batch List 210 (FIG. 2b), which is the next batch list available for prefetching of one or more messages from the transmission queue; a Current Batch List 212, which is the batch list being transmitted or is waiting for confirmation; and an Acknowledged Batch List 214, which is the batch list confirmed by the system on the other end of the channel.

The use of a plurality of batch lists enables messages to be prefetched, so that a new batch of messages can be transmitted over the channel, as soon as the channel is ready. This eliminates the idle time of the channel waiting for the messages to be assigned to a batch. In particular, a prefetch function is used to build a next batch of messages. With the prefetch capability, the channel is able to execute various functions substantially in parallel.

These functions include, for instance, transmitting a batch list to the receiver, prefetching messages for the next available list, and deleting an acknowledged batch list. This significantly reduces the elapsed time between prefetching, sending, and deleting batches of messages.

Figure 3:
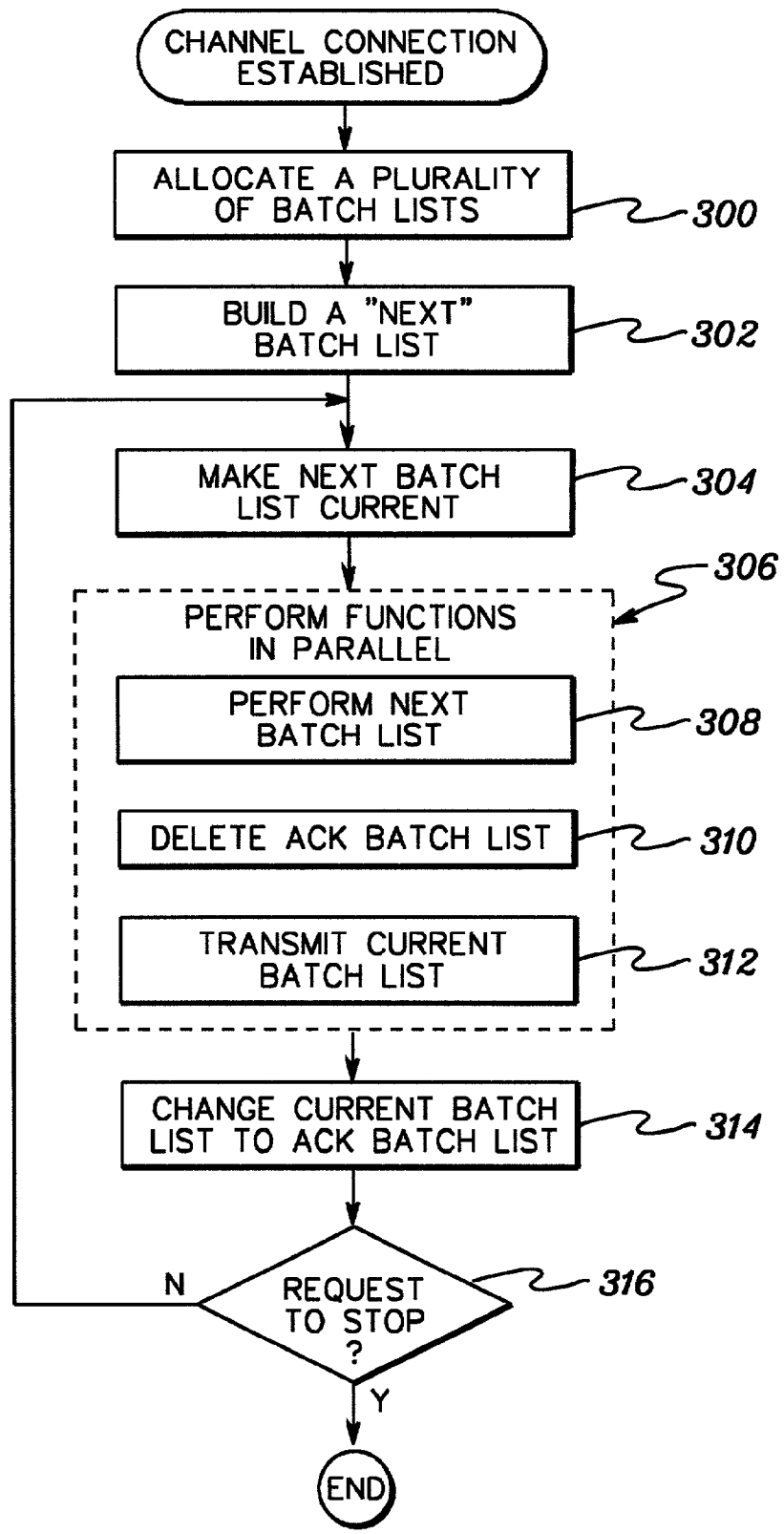
FIG. 3 depicts one embodiment of the logic associated with using a plurality of batch lists to perform various functions of a sender channel of the communications environment of FIG. 1, in accordance with an aspect of the present invention.

One embodiment of the logic associated with a channel performing these functions is described with reference to FIG. 3. Initially, when a channel connection is established, a plurality of batch lists are allocated in memory, STEP 300. The size of a batch list is an indication of how many messages can be included in the batch. The batch lists can be of the same size or differing sizes. As described above, in this example, there are three batch lists: the Current Batch List; the Next Batch List; and the Acknowledged Batch List.

Figure 4A:
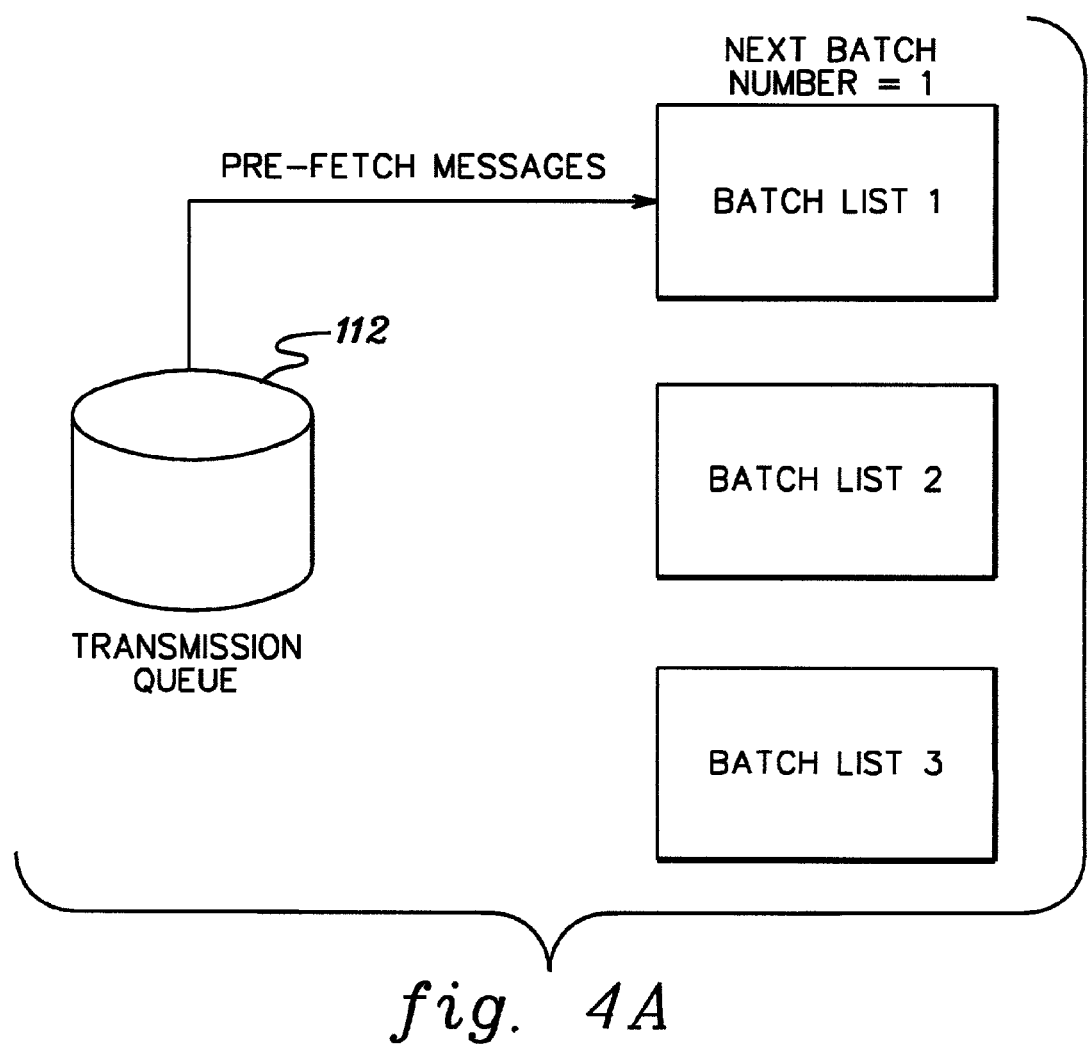
FIGS. 4a–4d depict various examples of using the plurality of batch lists, in accordance with an aspect of the present invention.

Subsequent to allocating the plurality of batch lists in memory, a prefetch function is invoked to build a batch list using the Next Batch List, STEP 302. Since in this example, it is the start of the channel connection, the next available batch list is Batch List 1 (see, e.g., FIG. 4a). Thus, messages are prefetched from transmission queue 112 into Batch List 1. The prefetching is an assigning of a batch number to the messages of the batch. In this case, Batch Number 1 is assigned to the messages. Since there is no Current Batch or Acknowledged Batch at this point, the current batch number and the acknowledged batch number are both zero.

Figure 4B:
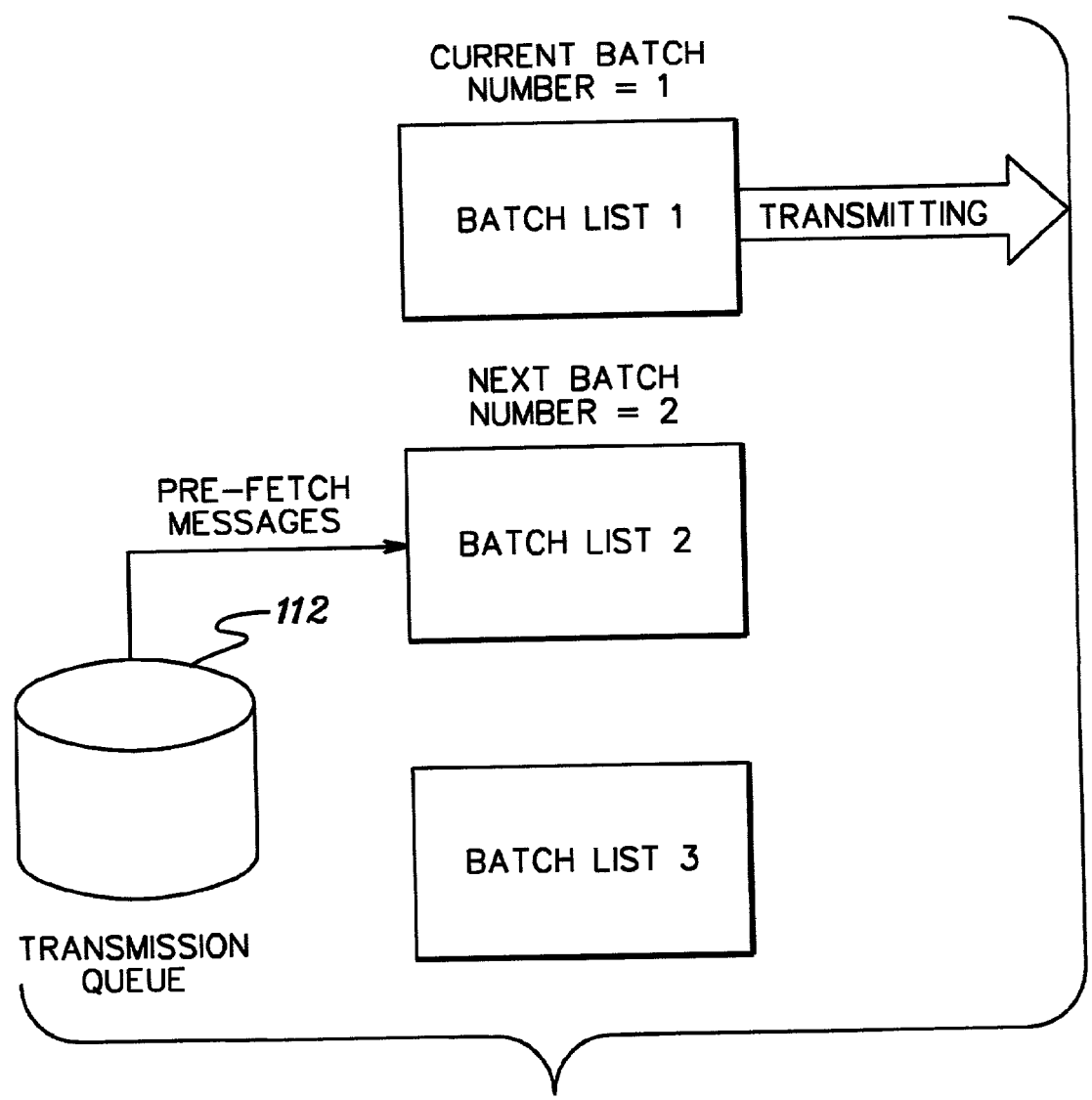

Returning to FIG. 3, after completing the build of the Next Batch List, the Next Batch List is made the Current Batch List, as shown in FIG. 4b, in which Batch List 1 is now affiliated with the current batch, STEP 304 (FIG. 3). Thereafter, various functions can be performed substantially in parallel, STEP 306. For example, messages for the Next Batch List (e.g., Batch List 2 of FIG. 4b) are prefetched from the transmission queue, STEP 308; messages from the Acknowledged (ACK) Batch List, if one exists, are deleted from the transmission queue, STEP 310; and messages from the Current Batch List are transmitted to the receiver, STEP 312. Thus, as shown in FIG. 4b, the Current Batch, Batch Number 1, is transmitted to the receiver, and messages are assigned to the Next Batch, Batch Number 2. At this point, the Acknowledged Batch Number is still zero.

Figure 4C:
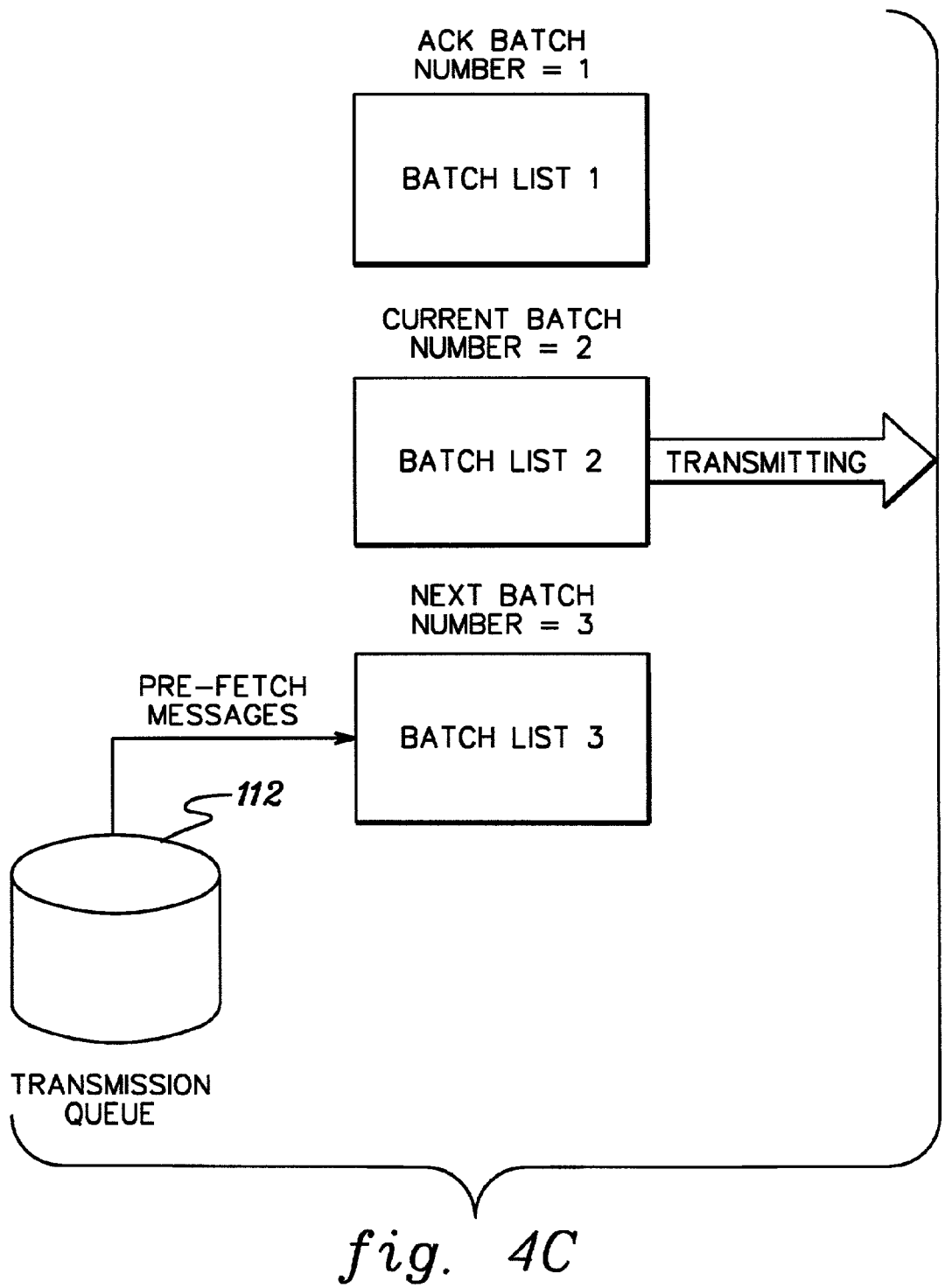

Referring again to FIG. 3, subsequently, when a confirmation is received for the Current Batch, the Current Batch List is changed to the Acknowledged Batch List, STEP 314. This is pictorially depicted in FIG. 4c, in which Batch Number 1 is now referred to as the Acknowledged (ACK) Batch List rather than the Current Batch List.

Thereafter, if there is no request to stop the channel, INQUIRY 316, then processing continues with STEP 304. In particular, the Next Batch List is made the Current Batch List, so that the sender channel can immediately send another batch of messages. The channel does not have to wait for the next batch list to be built because the prefetch of the next batch list has been completed ahead of time.

Figure 4D:
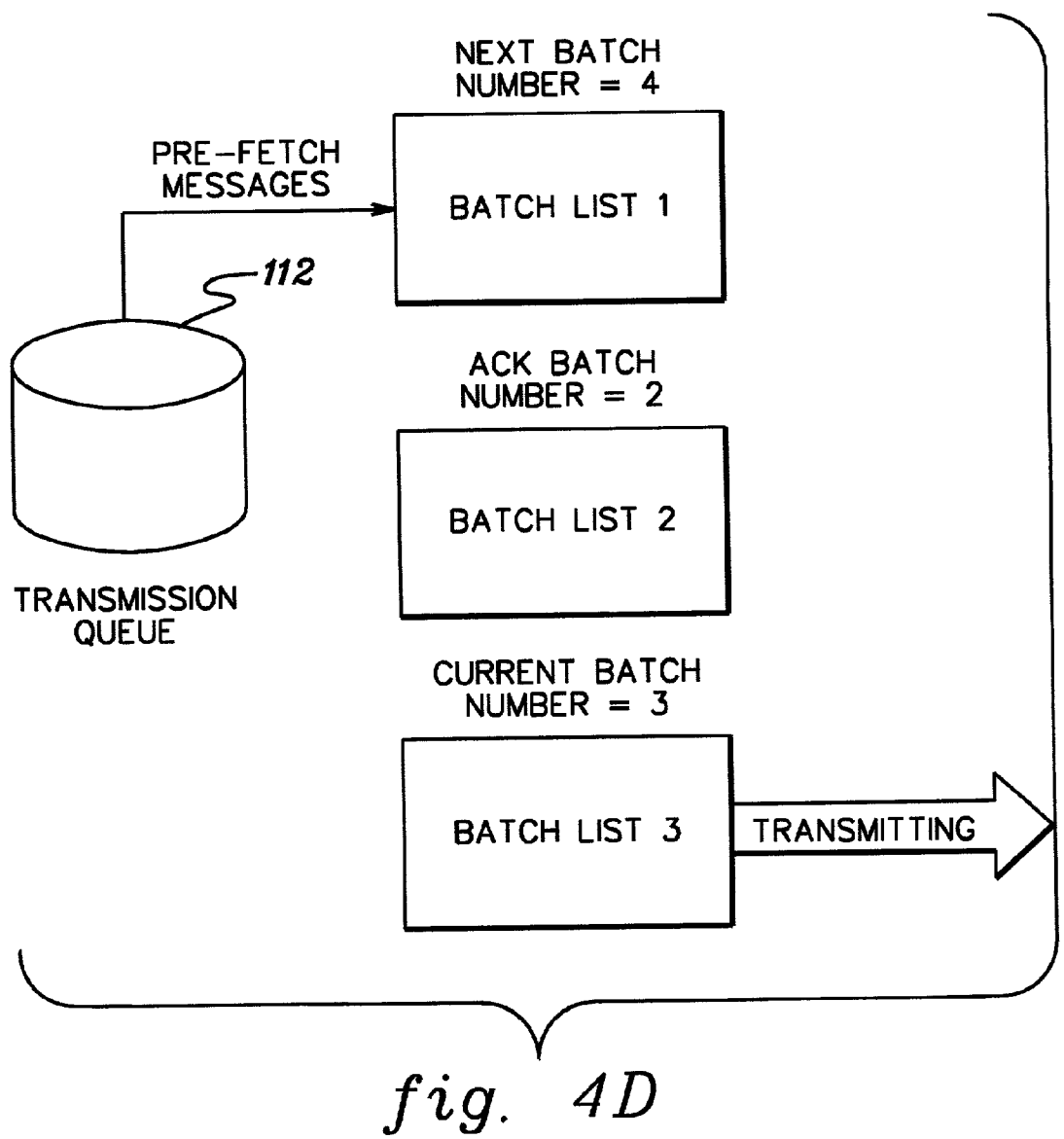

As described above, at some point during the processing, the messages of the ACK Batch list are deleted. When this occurs, then the batch list corresponding to the ACK Batch can be used for the Next Batch List again, as shown by the progression depicted in FIGS. 4c–4d. Specifically, in FIG. 4c, Batch List 1 is the ACK Batch. After the messages are deleted from Batch List 1, Batch List 1 is used as the Next Batch, as depicted in FIG. 4d. Thus, in FIG. 4d, Batch List 1 is the Next Batch (Batch Number 4), Batch List 2 is the ACK Batch (Batch Number 2), and Batch List 3 is the Current Batch (Batch Number 3). As seen, the batch numbers are unique numbers starting at 1.

Figure 6:
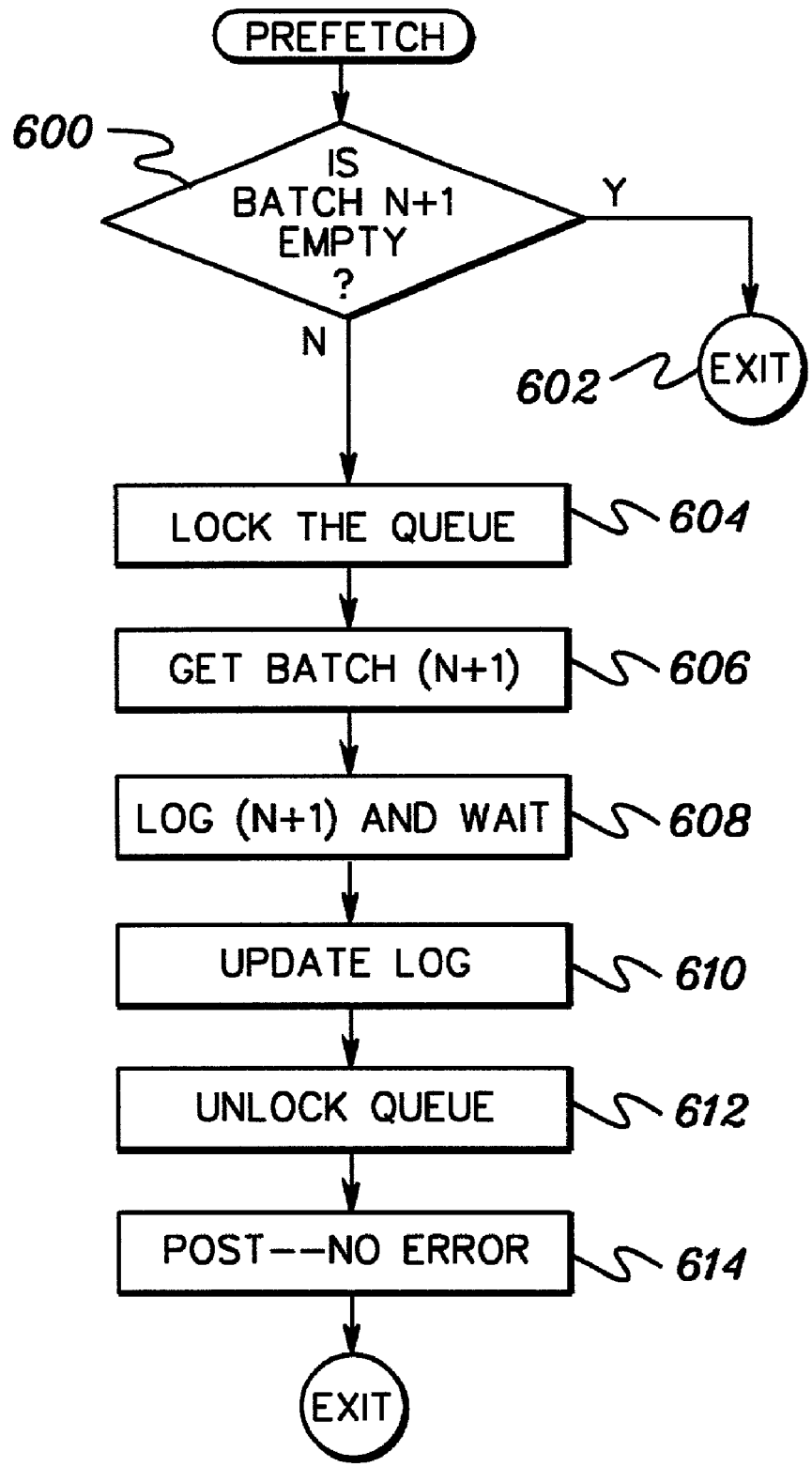
FIG. 6 depicts one embodiment of the logic associated with prefetching messages to be forwarded to a receiver, in accordance with an aspect of the present invention.
Figure 7:
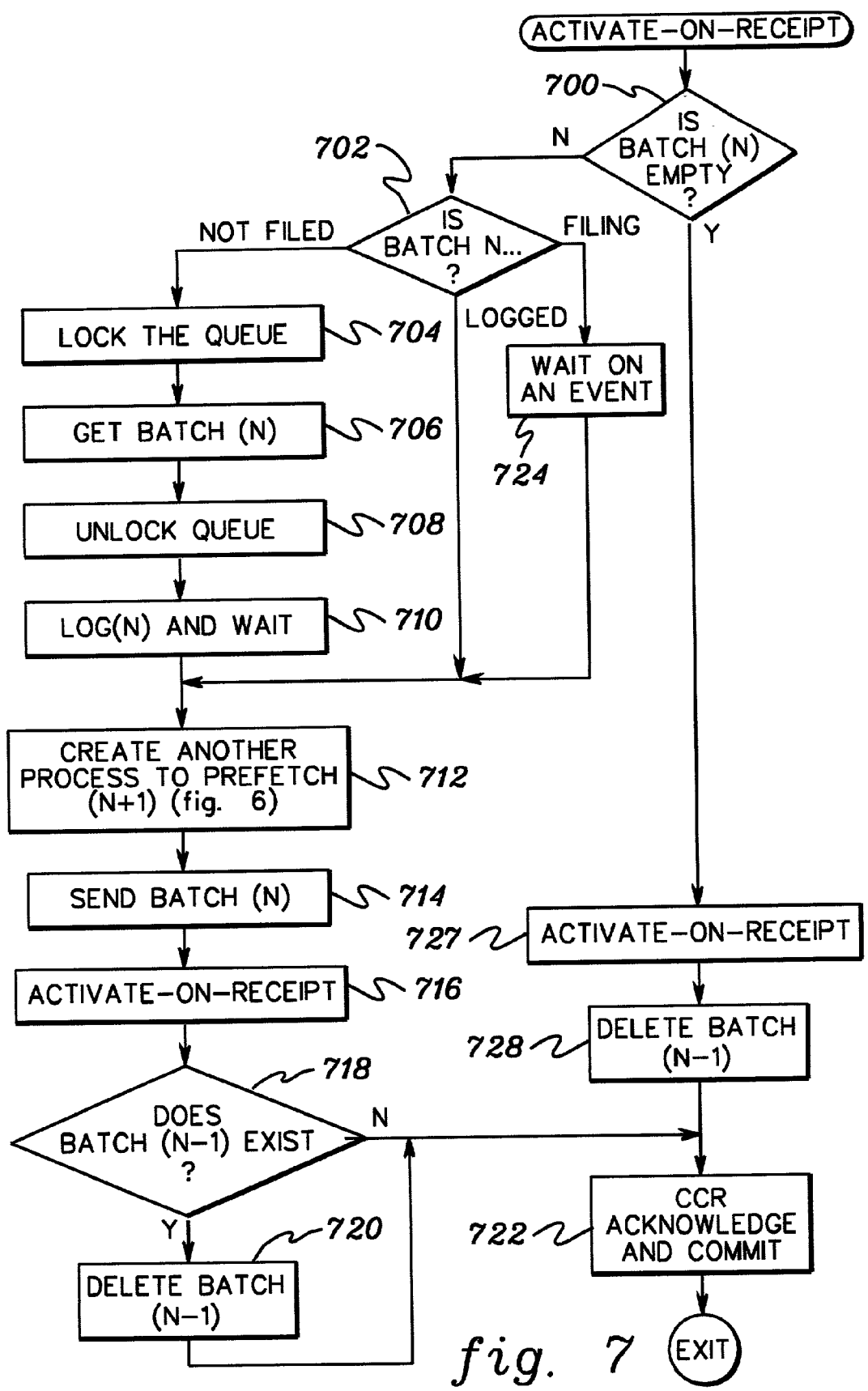
FIG. 7 depicts one embodiment of the logic associated with parallel processing of various functions of a channel, in accordance with an aspect of the present invention.

Further details regarding the logic associated with using a plurality of batch lists to improve performance of a channel are described with reference to FIGS. 5a–7. Specifically, FIG. 5a describes one embodiment of the logic associated with starting the sender channel logic; FIG. 5b depicts one embodiment of the logic associated with placing messages on an empty queue; FIG. 6 depicts one embodiment of the logic used to prefetch messages; and FIG. 7 depicts one embodiment of the logic used to perform various functions substantially in parallel, when the sender receives an acknowledgment from the receiver that the receiver has received a batch of messages.

Figure 5A:
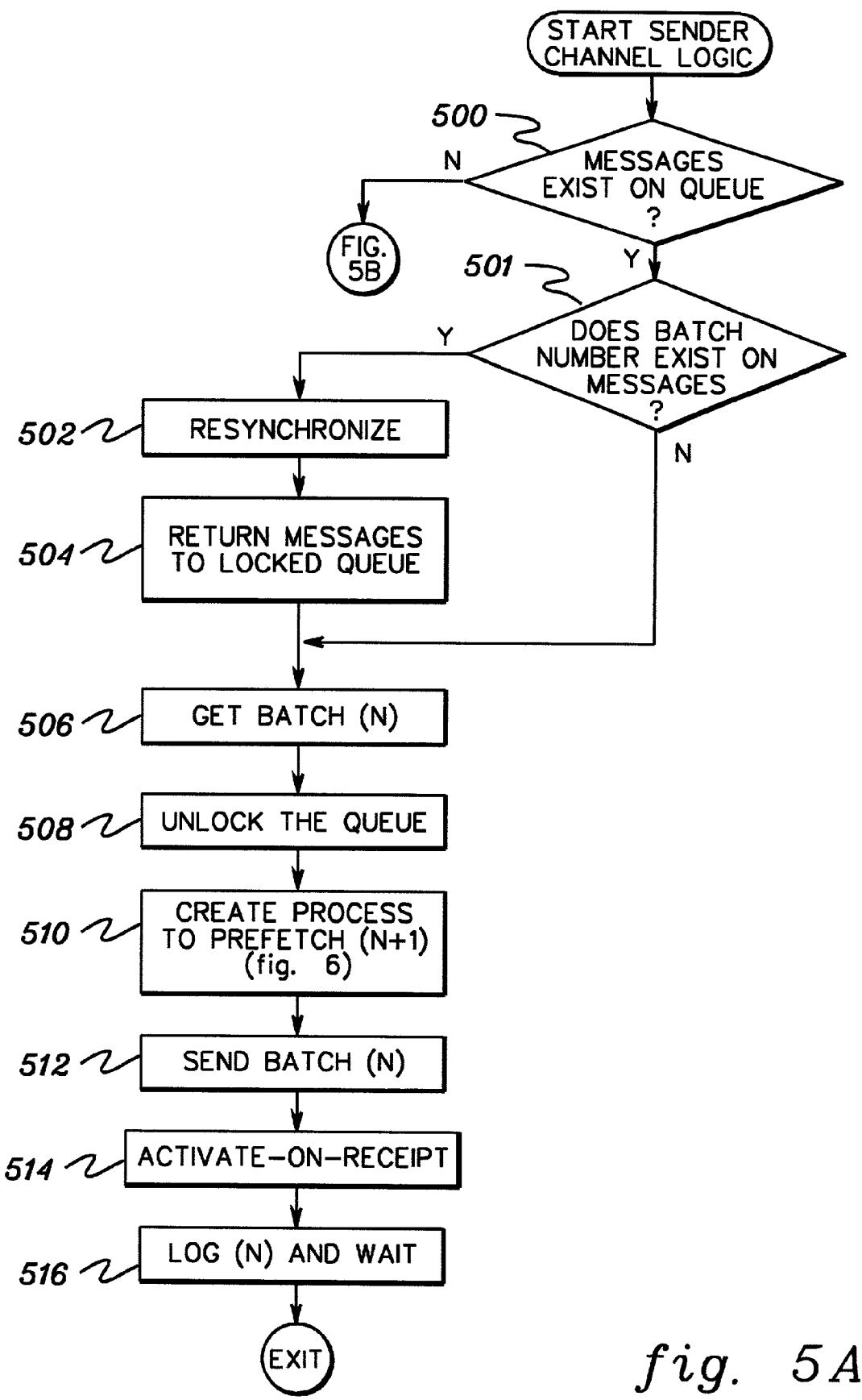
FIG. 5a depicts one example of the logic associated with starting a sender channel, in accordance with an aspect of the present invention.
Figure 5B:
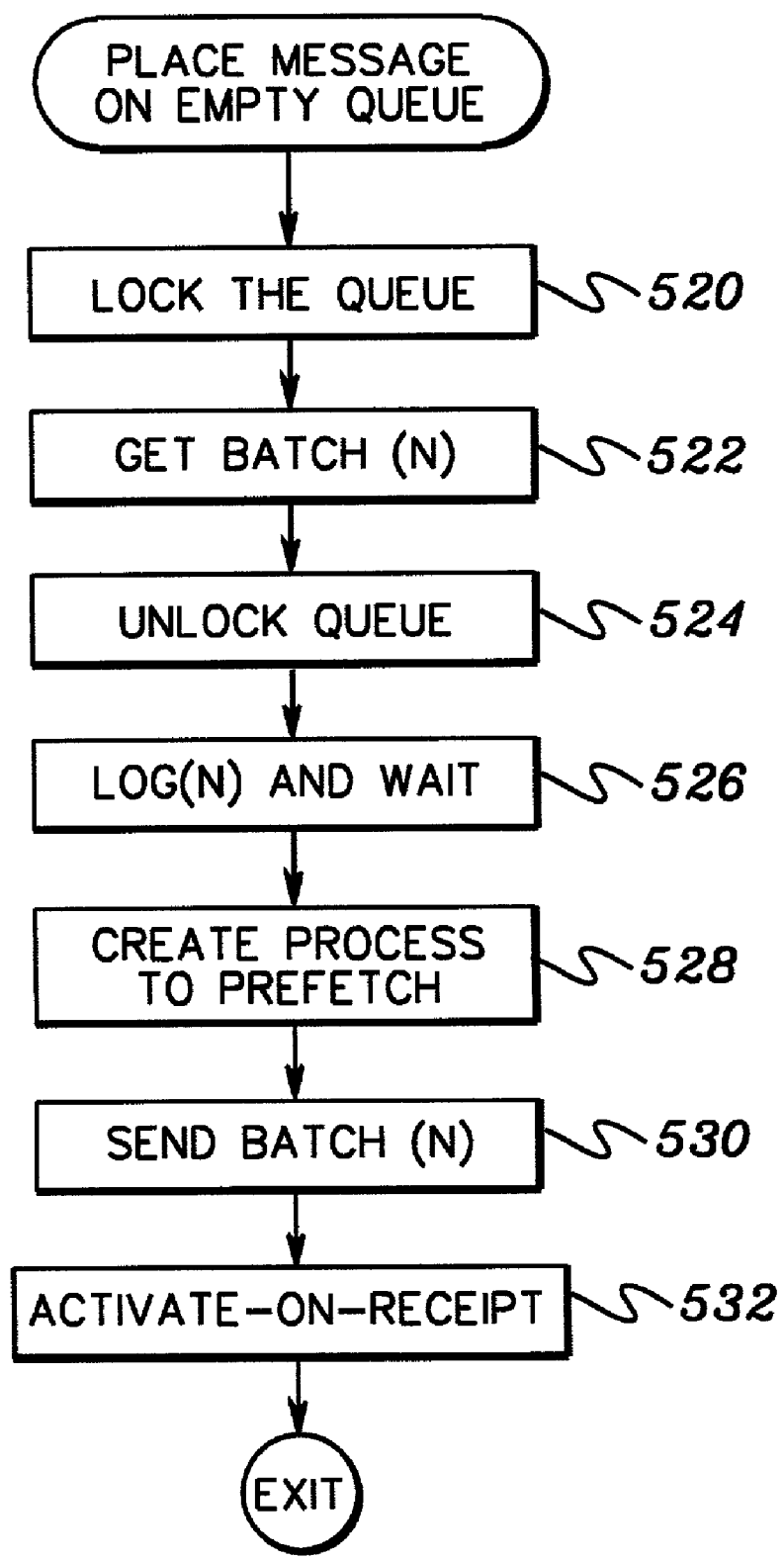
FIG. 5b depicts one embodiment of the logic associated with placing a message onto an empty queue, in accordance with an aspect of the present invention.

Referring to FIG. 5a, when an operator initiates a start sender channel, various functions are performed. For instance, initially a determination is made as to whether any messages exist on the transmission queue, INQUIRY 500. Should there be messages on the transmission queue, then a further determination is made as to whether a batch number has already been assigned to the messages in the transmission queue, INQUIRY 501. If a batch number does exist, then a re-synchronization function is performed to determine the next batch number to be used, STEP 502. This re-synchronization function includes exchanging the highest batch number with the receiver to determine if the receiver has already received messages with that number. If not, re-synchronization continues with the next lower number until it is determined which batch of messages is to be processed next.

Once the batch numbers are resolved, the messages are returned to the transmission queue, which has been locked, STEP 504. This means that any existing batch numbers are removed from the batch of messages to be processed next. Thereafter, or if no batch number exists on the messages, a get batch (N) is performed to mark each of the messages of the batch with the agreed upon batch number, STEP 506. Thereafter, the queue is unlocked, STEP 508.

Next, a process is created to prefetch the next batch of messages (i.e., Batch (N+1)), STEP 510. This prefetching is asynchronous to the other logic being performed by the start sender channel. Thus, this prefetch can be performed in parallel with the other logic of the channel. Prefetching is further described with reference to FIG. 6.

In addition to creating the process to prefetch the next batch of messages, the current batch of messages (i.e., Batch (N)) is sent to the receiver, STEP 512. Then, an Activate-on-Receipt (AOR) is issued to read the acknowledgment from the receiver when it comes in, STEP 514. Further, the messages of Batch (N) are logged by, for instance, writing them to a storage medium, such as DASD, STEP 516. This concludes the start sender channel logic.

Returning to INQUIRY 500, if there are no messages on the queue, then processing waits for a message to be placed on the empty transmission queue by an application. When such a message is placed, then the logic of FIG. 5b is performed.

Referring to FIG. 5b, initially, the transmission queue is locked, STEP 520. Then, a get batch (N) is performed in order to assign the message, as well as one or more other messages that have since been added to the queue, to a batch, STEP 522. Thereafter, the queue is unlocked, STEP 524.

Next, any messages of Batch (N) are logged, and the logic waits until that logging is complete, STEP 526. After the logging is complete, a process is created to prefetch the next batch of messages, STEP 528. As described above, this prefetching can be performed in parallel with other logic being performed by the channel. For instance, the current batch (e.g., Batch N) can be sent to the receiver, STEP 530, at the same time that prefetching is performed for Batch (N+1). Thereafter, an Activate-on-Receipt is issued, STEP 532.

As described above, while a batch of messages is being transmitted to the receiver, another batch of messages may be prefetched. The channel keeps track of these different batches by using the various batch lists: the Current Batch List, the Next Batch List, and the Acknowledged Batch List.

One embodiment of the logic associated with prefetching the next batch of messages is described with reference to FIG. 6. Initially, a determination is made as to whether there are any messages on the transmission queue to be assigned to a new batch, INQUIRY 600. If there are no such messages, then processing is complete, STEP 602. However, if there are messages to be assigned, then the transmission queue is locked, STEP 604, and a get batch (N+1) is performed in order to assign one or more messages to the next batch (e.g., Batch N+1) to be processed, STEP 606. The number of messages assigned depends on the size of the batch list. Further, the particular number assigned to the batch is the next number in ascending order.

Thereafter, the messages of the Next Batch are logged, as described above, STEP 608. Subsequent to logging the messages, a recovery log is updated to indicate that the assigning of the messages to a batch is complete, STEP 610.

Thereafter, the transmission queue is unlocked, STEP 612, and a signal is posted indicating that there has been no error in the logging, STEP 614. This concludes the prefetching.

In accordance with an aspect of the present invention, the prefetch function, as well as the send and delete functions, can proceed substantially in parallel, since three batch lists are used to keep track of the various batches being processed. One example of the interplay of these various functions is described with reference to FIG. 7. In one embodiment, this processing is triggered when the sender receives an acknowledgment from the receiver that the receiver has received the messages of Batch N−1.

Referring to FIG. 7, initially, a determination is made as to whether Batch N is empty, INQUIRY 700. That is, a determination is made as to whether there are any messages on the transmission queue to be assigned or in the process of being assigned to a new batch (Batch N). If there are such messages, then a further determination is made as to the status of Batch N, INQUIRY 702. If the messages of Batch N have not been filed on the log, then various steps are performed. For instance, the transmission queue is locked, STEP 704, and a get batch is performed in order to assign a batch number to one or more messages of the queue, STEP 706. Thereafter, the queue is unlocked, STEP 708, and the messages of Batch N are logged, STEP 710.

Subsequent to the logging, another process is created in order to prefetch messages for the next batch (Batch N+1), STEP 712. The manner in which this is accomplished is described above with reference to FIG. 6. Additionally, Batch N is sent to the remote receiver, STEP 714, and an Activate-on-Receipt is issued, STEP 716.

Further, a determination is made as to whether Batch N−1 exists, INQUIRY 718. If Batch N−1 does exist, then the messages of that batch are deleted from the transmission queue, STEP 720. Thereafter, or if Batch N−1 does not exist, then a Commit Control Record (CCR) acknowledge and commit are commenced, STEP 722.

Returning to INQUIRY 702, if the status of Batch N is logged, indicating that messages have already been assigned to Batch N and logged, then processing continues with STEP 712, which includes creating another process to prefetch the next batch of messages.

However, if the status of Batch N is filing, indicating that the logging is taking place, then the logic waits on an event, STEP 724. In one example, the event is the completion of the logging. When the event is complete, then processing continues with STEP 712.

Returning to INQUIRY 700, if there are no messages on the queue to be assigned to Batch N, then an Activate-on-Receipt is issued, STEP 726, and the messages of Batch N−1 are deleted from the transmission queue, STEP 728. Further, a CCR acknowledge and commit are performed, STEP 722.

As described in detail above, prefetching of a new batch of messages, sending of the current batch of messages, and the deleting of messages from a previously acknowledged batch can all occur in parallel. This is made possible by the use of separate batch lists: a Next Batch List, a Current Batch List and an Acknowledged Batch List, managed by the channel. This advantageously increases the speed of the channel, by reducing the idle times of the channel.

For example, while the sender is transmitting one batch of messages, another batch of messages can be prefetched, while yet another batch of messages can be deleted from the transmission queue. This reduces the idle times of the channel, thus increasing the efficiency of the channel.

Although in the example herein, the channel is an MQSeries sender channel, this is only one example. The invention is applicable to any technology in which messages are sent in batches from a sender to a receiver. Further, although the operating system is described as TPF, again this is only one example. Various other operating systems can be used. Further, the operating systems in the different computing units can be heterogeneous. The invention works with different platforms.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of accessing memory to perform messaging using a channel coupled to a sender and a receiver, said method comprising:
   assigning, by a separate process, one or more messages to a queue batch list in a first area of memory;
   deleting one or more messages of an acknowledged batch list in a second area of memory, if said one or more messages of said acknowledged batch list exist;
   transmittin a current batch list of one or more messages in a third area of memory from the sender to the receiver, wherein the first area of memory, second area of memory and third area of memory are accessed substantially in parallel such that said assigning, deleting and transmitting are performed substantially in parallel; and
   changing the current batch list to the acknowledged batch list and the queue batch list to the current batch list, and repeating said assigning, deleting and transmitting, wherein the queue batch list overwrites the acknowledged batch list from which one or more messages were deleted.

2. A system of accessing memory to perform messaging using a channel coupled to a sender and a receiver, said system comprising:
   means for assigning, by a separate process, one or more messages to a queue batch list in a first area of memory;
   means for deleting one or more messages of an acknowledged batch list in a second area of memory, if said one or more messages of said acknowledged batch list exist;
   means for transmitting a current batch list of one or more messages in a third area of memory from the sender to the receiver, wherein the first area of memory, second area of memory and third area of memory are accessed substantially in parallel such that said assigning, deleting and transmitting are performed substantially in parallel; and
   means for changing the current batch list to the acknowledged batch list and the queue batch list to the current batch list, and means for repeating the assigning, deleting and transmitting, wherein the queue batch list overwrites the acknowledged batch list from which one or more messages were deleted.

3. At least one program storage device readable by a machine, tangibly embodying at least one program of instructions executable by the machine to perform a method of accessing memory to perform messaging using a channel coupled to a sender and a receiver, said method comprising:
   assigning, by a separate process, one or more messages to a queue batch list in a first area of memory;
   deleting one or more messages of an acknowledged batch list in a second area of memory, if said one or more messages of said acknowledged batch list exist;
   transmitting a current batch list of one or more messages in a third area of memory from the sender to the receiver, wherein the first area of memory, second area of memory and third area of memory are accessed substantially in parallel such that said assigning, deleting and transmitting are performed substantially in parallel; and
   changing the current batch list to the acknowledged batch list and the queue batch list to the current batch list, and repeating said assigning, deleting and transmitting, wherein the queue batch list overwrites the acknowledged batch list from which one or more messages were deleted.

* * * * *